G. A. CAMPBELL.
SIGNALING CIRCUIT.
APPLICATION FILED AUG. 18, 1917.

1,254,116.

Patented Jan. 22, 1918.
3 SHEETS—SHEET 1.

INVENTOR.
G.A.Campbell
BY Thomas D. Lockwood
ATTORNEY

UNITED STATES PATENT OFFICE.

GEORGE A. CAMPBELL, OF MONTCLAIR, NEW JERSEY, ASSIGNOR TO AMERICAN TELEPHONE AND TELEGRAPH COMPANY, A CORPORATION OF NEW YORK.

SIGNALING-CIRCUIT.

1,254,116.  Specification of Letters Patent.  Patented Jan. 22, 1918.

Application filed August 18, 1917. Serial No. 186,912.

*To all whom it may concern:*

Be it known that I, GEORGE A. CAMPBELL, residing at Montclair, in the county of Essex and State of New Jersey, have invented certain Improvements in Signaling-Circuits, of which the following is a specification.

This invention relates to circuit arrangements for signaling systems wherein signals may be either transmitted from or received at the same station. In its more specific aspects this invention is embodied in a subscriber's telephone station, hereinafter termed, in accordance with common usage, a substation, and more particularly in the combination of a substation and a telephone line. Its object is to provide a signaling circuit arrangement which in coöperative combination with a similar and equal communicating arrangement or station shall deliver the maximum amount of energy to the receiving apparatus of said communicating station or arrangement. A further object is to provide an arrangement such that the receiving apparatus is protected from interference by the transmission energy originating at the same station. In other words its object is to provide signaling means characterized by the maximum possible ratio of received to transmitted energy and further characterized by the absence of side tone.

The object of the invention is attained, in its specific aspect, by providing a substation consisting of transmitter, receiver, auxiliary resistance, and a transformer having a plurality of windings which, in combination with a telephone line, shall satisfy the following fundamental requirement: Given two identical substations designed for invariable two-way communication, and connected by a line of given impedance and length, the amount of energy absorbed by the receiver at the receiving station shall be the maximum part of the total telephonic energy developed by the transmitter at the transmitting station consistent with invariable two-way communication, and, as hereinafter explained, consistent with a desirable amount of discrimination against disturbing line noise. This fundamental requirement may be stated in terms of the following subordinate requirements which are necessary for its satisfaction: (1) The transmitter and receiver shall be conjugate, that is, there shall be negligible side tone in the receiver in consequence of the actuation of the transmitter by sound waves; (2) the line and auxiliary resistance shall be conjugate in order that none of the energy absorbed by the substation from the line shall be wasted in said auxiliary resistance; (3) for a given line having a definite impedance the telephonic energy delivered by the transmitter shall be a maximum; (4) the amount of energy delivered by the line to the substation shall be a maximum, in other words the impedance of the substation as seen from the lines shall be equal to the impedance of the line; (5) at a small sacrifice of efficiency it shall be possible to discriminate effectively against disturbing line noise as distinguished from the telephonic signals from the communicating station.

A substation satisfying the above-mentioned requirements is ideal in that its over-all efficiency from transmitter of one substation to receiver of the communicating substation is a theoretical maximum which cannot be exceeded by any invariable substations whether satisfying the requirement of transmitter and receiver conjugacy or not. It is further ideal in the sense that a minimum number of elements is employed since at least one auxiliary element is necessary to secure freedom from side tone.

It might be inferred that the addition of an auxiliary resistance element, necessary as it is to secure freedom from side tone, would at the same time necessarily reduce the efficiency of the substation since energy is unavoidably wasted in said auxiliary resistance. That this is not the case and that the efficiency of the substation of my invention is a theoretical maximum which cannot be exceeded by any two-way substation whether with or without side tone, the following considerations will show. The simplest form of substation for invariable two-way communication is that in which the receiver and transmitter are connected in series with each other across the line. In such an arrangement the over-all efficiency is a maximum when the resistance of the receiver is equal to that of the transmitter. When this condition is satisfied obviously fifty per cent. of the energy delivered by the line to the substation is wasted in the transmitter and fifty per cent. of the energy delivered by the transmitter is wasted in the receiver. Further, such an arrangement labors under the disadvantage of full side tone. In the substation of my invention fifty per cent. of the energy delivered by the line to the substation is wasted in the transmitter but none in the auxiliary resistance if said auxiliary resistance and said line are conjugate; hence the efficiency is as great as that of the simple series substation. When transmitting no energy is wasted in the receiver but fifty per cent. of the energy delivered by the transmitter is wasted in the auxiliary resistance. The transmitting efficiency is therefore also a theoretical maximum and neither transmitting nor receiving efficiency is reduced by the addition of the auxiliary resistance which is necessary to secure freedom from side tone. The foregoing consideration will serve to explain the desirability of having the line and auxiliary resistance conjugate as well as the transmitter and receiver.

In my present invention I provide a substation comprising transmitter, receiver, auxiliary resistance and transformer and so proportion said component elements and so relate them to a telephone line and to each other that, in combination with said telephone line, said substation satisfies all of the foregoing requirements.

I have discovered that the above-mentioned requirements may be satisfied by a large number of arrangements employing the minimum number of elements and all equally efficient and without side tone. While theoretically all these arrangements are equally good, practical considerations make certain arrangements preferable.

My invention will now be fully understood by reference to the accompanying drawing in which:

Figs. 2, 6, 10, 14, 18 and 22 are circuit diagrams showing the arrangement of the several forms of substations in greater detail. Figs. 4, 8, 12, 16, 20 and 24 are similar diagrams indicating the relative direction of current flow during reception. In the above diagrams the direction of winding of the transformer coils and the direction of current flow as indicated are merely conventional and only hold true for particular values of the elements of the substation. It will be clear from an inspection of the design formulæ hereinafter set forth that the winding ratios $r$ and $r'$ may, in general, be either positive or negative, depending upon the values of the line and transmitter resistances. If, therefore, for any particular design one or both of the winding ratios result in a negative value, it is to be interpreted as meaning that the relative direction of winding of the coils whose winding ratio is negative must be the reverse of that shown in the diagram.

In order to illustrate the scope of my invention and elucidate the principles on which all specific embodiments rest, a general theoretical discussion will now be given which applies to all substations satisfying the requirements heretofore stated in this specification. In this discussion and the equations and formulæ included in this specification the subscripts 1, 2, 3 and 4 will refer to transmitter, receiver, auxiliary resistance and line respectively. Thus $I_1$, $I_2$, $I_3$, $I_4$ will denote the currents flowing in transmitter, receiver, auxiliary resistance and line respectively, while $R_1$ will denote the resistance of the transmitter, $R_2$ the resistance of the receiver, etc.

Consider a substation consisting of transmitter, receiver, auxiliary resistance and appropriate transformer windings, connected to a line of given impedance. In practice the line connects two similar and equal substations between which communication is established. It is a well known principle that if a terminal impedance is connected to a source of electromotive force through a line of impedance $$Z = R_4 + iR'_4,$$

where $R_4$ is the resistance and $R'_4$ the reactance component of the impedance, the terminal impedance must be $R_4 - iR'_4$ for maximum absorption of energy. In particular, if the line impedance has no reactance component, the impedance of the terminal arrangement as seen from the line should be equal to the resistance component of the impedance of the line. The condition, then, that the substation shall have maximum energy absorption from the line is that its impedance, as seen from the line, shall be equal to the line impedance.

The significance of the foregoing statement may be explained by reference to Fig. 2, as follows: Let the substation be disconnected from the line and let the impedance of the substation be measured across terminals $a$ and $d$. Then the impedance so measured shall be equal to the impedance of the line. With the line terminated at each end by a substation satisfying this condition, the line may be replaced, as regards transmission from either substation, by an impedance element of resistance equal to the impedance of the line. Any reactance effect, which is in practice small, may be eliminated by neutralizing reactance and, therefore, need not be considered. The condition, then, that the substation have maximum energy absorption from the line is that its impedance as seen from the line be a pure resistance of value equal to the impedance of the line. This condition is evidently equivalent to the following requirement; let an electromotive force be impressed on the substation terminals through a resistance equal to the impedance of the line; then the energy consumed in the substation shall be equal to the energy consumed in said resistance.

Further, line and auxiliary resistance are conjugate by requirement (2), as hereinbefore stated, or in other words, the auxiliary resistance is connected to points of equal potential with respect to an electromotive force applied to the line terminals. Moreover, the impedance of the substations as seen from the line should be equal to that of the line. Let, then, an electromotive force $E_4$ be impressed through a resistance $R_4$ on a substation whose transmitter and receiver resistances are $R_1$ and $R_2$ respectively, and let the resultant currents in line, transmitter and receiver be $I_4$, $I_1$ and $I_2$ respectively, the impedance across the substation terminals must be $R_4$ as seen from the line and the total resistance in series with $E_4$ is $2R_4$, and since the current in the line is $I_4$, it follows that $$\frac{E_4}{2R_4} = I_4$$

The total energy consumed may then be expressed by the formula $$I_4^2 R_4 + I_1^2 R_1 + I_2^2 R_2 = I_4 E_4 = \frac{E_4^2}{2R_4}$$

Since the energy consumed by the substation is equal to that consumed by the resistance $R_4$ and is therefore one-half of the total energy consumed, it follows that requirement 4 may be formulated by the following:

$$R_4(I_4)^2 = (I_2)^2 R_2 + (I_1)^2 R_1 = \frac{(E_4)^2}{4R_4} \quad (1)$$

This equation states that the energy consumption in the resistance $R_4$ is equal to that in the substation, and that the substation is equivalent, as seen from the line, to a resistance of value $R_4$.

Similarly, if transmitter and receiver are conjugate the condition that the transmitter shall have its maximum output to line and auxiliary resistance may be formulated as follows: Let an electromotive force $E_1$ in the transmitter produce currents $I_1$, $I_4$ and $I_3$ in transmitter, line and auxiliary resistance. Then, for maximum output, it follows that $$(I_1)^2 R_1 = (I_4)^2 R_4 + (I_3)^2 R_3 = \frac{(E_1)^2}{4R_1} \quad (2)$$

Equation (2) is the analogue of equation (1) and may be interpreted as follows by reference to Fig. 2. Let the transmitter be disconnected from the terminals $b$ and $e$ and let the impedance be measured across said terminals. Then if equation (2) is satisfied the impedance so measured is equal to the impedance of the transmitter. In other words, the impedance of the combination as seen from the transmitter is equal to that of the transmitter itself.

As hereinafter shown for the particular embodiments of my invention, equation (2) follows as a consequence of the conditions of double conjugacy and equation (1). Therefore the foregoing four requirements impose but three restrictions on the substation.

To complete the general discussion it remains to consider the energy division between receiver and transmitter when receiving, and between line and auxiliary resistance when transmitting. Let $W_0$ be the total amount of telephonic energy developed by the transmitter at the transmitting substation; then, by equation (2), $1/2 W_0$ is the amount of energy delivered to line and auxiliary resistance. Let the amount of energy taken by the auxiliary resistance be $x$ times that taken by the line, then the amount of energy taken by the line is $$1/2 W_0 \frac{1}{(1+x)}$$

so that the transmitting efficiency is measured by $$\frac{1}{(1+x)} \quad (3)$$

Of the total energy delivered to the receiving substation, let the transmitter absorb $y$ times that absorbed by receiver; then the receiving efficiency is measured by $$\frac{1}{(1+y)} \quad (4)$$

The over-all efficiency from transmitter of one station to receiver of communicating station is clearly proportional to the product of the transmission efficiency and receiving efficiency; therefore the over-all efficiency is by formulæ (3) and (4):

$$\left(\frac{1}{1+x}\right)\left(\frac{1}{1+y}\right)$$

If $x$ and $y$ were independent, clearly the over-all efficiency would be a maximum for $x = y = 0$. For all substations embodying the principles of my invention it may be readily shown, however, that $x$ and $y$ are connected by the relation $xy=1$. Eliminating $x$ from the above formula by means of this relation, the expression for the over-all efficiency becomes $$\frac{y}{(1+y)^2} \quad (5)$$

In order to demonstrate the above statement, namely that $xy=1$, designate the elements or branches T, R, X and L by 1, 2, 3 and 4, respectively, and let 1 and 2 be conjugate and also 3 and 4 be conjugate. Further it will be assumed for an electromotive force in branch 4, equation (1) is satisfied while for an electromotive force in branch (1), equation (2) is satisfied. Let $S_{11}$ denote the current produced in branch or element 1 by a unit electromotive force in branch 1, $S_{12}$ the current produced in branch 2 by a unit electromotive force in branch 1, etc. Then by the conjugacy of branches 1 and 2 and branches 3 and 4, it follows that $$S_{12}=S_{34}=0$$

Also by equation (1)

$$(S_{44})^2 R_4 = (S_{42})^2 R_2 + (S_{41})^2 R_1 = \frac{1}{4R_4} \quad (1')$$

and by equation (2)

$$(S_{11})^2 R_1 = (S_{13})^2 R_3 + (S_{14})^2 R_4 = \frac{1}{4R_1} \quad (2')$$

Now it is a fundamental principal which is deducible from elementary algebra, that $S_{41}=S_{14}$. That is, the current set up in branch 4 by a unit electromotive force in branch 4 is equal to the current set up in branch 4 by an unit electromotive force in branch 1. Multiplying equation (1') by $R_4$ and equation (2') by $R_1$ and subtracting it follows that:

$$(S_{42})^2 R_2 R_4 = (S_{13})^2 R_1 R_3 \quad (a)$$

Now in accordance with the notation adopted in this specification, the energy consumed in branch 3 is $x$ times that consumed in branch 4 when an electromotive force acts in branch 1; therefore $$(S_{13})^2 R_3 = x(S_{14})^2 R_4 \quad (b)$$

Also the energy consumed in branch 1 is $y$ times that consumed in branch 2 when an electromotive force acts in branch 4; whence $$(S_{14})^2 R_1 = y(S_{24})^2 R_2 \quad (c)$$

Multiplying (b) and (c)

$$(S_{13})^2 R_1 R_3 = xy(S_{24})^2 R_2 R_4 \quad (d)$$

From (a) and (d) it follows at once that $xy=1$.

Obviously the expression given by formula (5) is a maximum when $y=1$. This means that for a given amount of telephonic energy developed in the transmitter at the transmitting substation a maximum amount is usefully delivered to the receiver at the receiving substation connected by the line, when $y=1$. Since the maximum amount of energy in the receiver is the prime desideratum of telephony, it would appear that the substation should be designed to make $y=1$. Another consideration, however, modifies this conclusion somewhat, namely, the effect of line noise. Since the line noise originates in the line the amount delivered to the receiver is proportional to $$\frac{1}{1+y}$$

(see equation 4) while the amount of energy delivered from the transmitter of the communicating station is proportional to $$\frac{y}{(1+y)^2}$$

(see equation 5). The ratio of the latter to the former is $$\frac{y}{1+y},$$

and this increases as $y$ increases beyond unity. It will be clear, then, that if $y$ is made greater than unity the substation discriminates against line noise as compared with the signals it is desired to receive. The amount of discrimination desired depends of course on the amount of line noise present. For conditions occurring in practice I have found by experiment that a desirable value for $y$ is 1.4. With this value of $y$ the over-all efficiency is reduced 2.8% below the maximum for $y=1$, while the receiving efficiency alone is reduced 16.6%. It is thus seen that a good degree of discrimination against line noise is obtained with a small loss in over-all efficiency.

The above considerations as to over-all efficiency and discrimination against line noise may be formulated as $$R_1(I_1)^2 = y R_2(I_2)^2 \quad (6)$$

for an electromotive force inserted in the line. In this equation $y$ is to have a value lying between 1 and 1.5 preferably.

Figure 2:
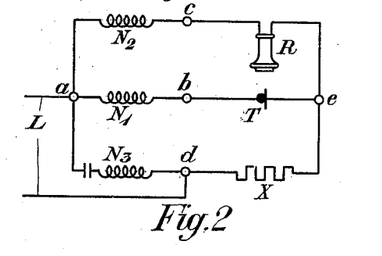

Proceeding now to a description of the specific circuits, in Fig. 2 a substation is illustrated comprising a transmitter T, a receiver R, an auxiliary resistance X, a line L and a three winding transformer having windings $N_1$, $N_2$ and $N_3$. The receiver R is connected in series with the winding $N_2$ between terminals $a$ and $e$. In a similar manner the transmitter T is connected in series with the winding $N_1$ between said terminals. The auxiliary resistance X is connected in series with the winding $N_3$ between terminals $a$ and $e$ and the line L is connected one side to the terminal $a$ and the other side to the junction point $d$ between the auxiliary resistance X and the winding $N_3$. If desired a condenser may be inserted in series with the winding $N_3$ to prevent the flow of direct current through said winding. Direct current from a central energy source is supplied to the line L and flows in parallel through the transmitter and receiver and thence through the auxiliary resistance X.

Figure 3:
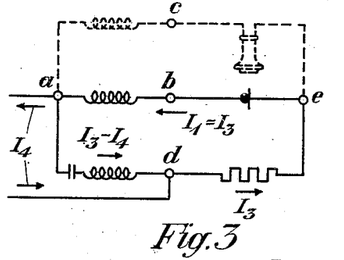
Figs. 3, 7, 11, 15, 19 and 23 are circuit diagrams indicating the relative direction during transmission of current flow in the several circuits shown in Figs. 2, 6, 10, 14, 18 and 22, respectively, the dotted lines indicating elements through which no current flows.

The operation of the substation of Fig. 2 in transmitting will be clear from an inspection of Fig. 3 in which the arrows indicate the relative directions of current flow. The actuation of the transmitter varies the current flowing in the transmitter circuit, its action being equivalent to setting up in the transmitter a variable electromotive force which causes an alternating current to flow. The direction of this current at a given instant of time is indicated by the arrow designated $I_1$. Since the transmitter and receiver are conjugate during transmission, no current will flow through the receiver and the auxiliary resistance X is in a series circuit with the transmitter. Consequently the current $I_3$ flowing through the auxiliary resistance is equal to the current $I_1$ flowing through the transmitter. At the terminal $a$ the current I divides and a current $I_4$ flows over the line and back to the junction point $d$, while a current $I_3-I_4$ flows through the winding $N_3$ to the point $d$. Potentials are induced in the windings of such value and direction as to reduce the terminal $c$ to the same potential as the terminal $e$, so that no current flows through the receiver during transmission.

Figure 4:
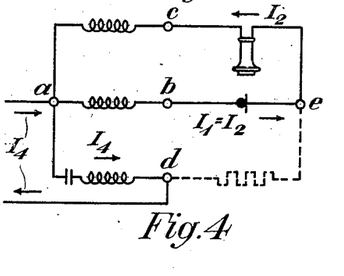
Figure 5:
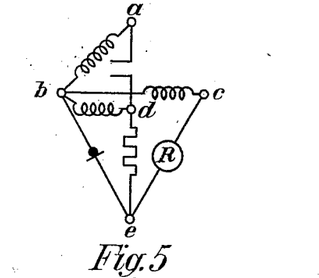

The action when receiving is indicated in Fig. 4. A potential applied to the line causes a current $I_4$ to flow to terminal $a$, through the winding $N_3$ to the terminal $d$ and back to the line. Since during reception the line and the auxiliary resistance X are conjugate, no current flows through the auxiliary resistance. The current flowing through the winding $N_3$ sets up electromotive forces in the windings $N_2$ and $N_1$, whereby a current $I_1$ equal to $I_2$ flows in a local circuit from terminal $a$, through the winding $N_1$, transmitter T, receiver R and winding $N_2$ back to terminal $a$. The electromotive forces induced in these windings reduce the terminal $e$ to the same potential as the terminal $d$, so that no current flows through the auxiliary resistance. As a result no energy loss occurs in the auxiliary resistance and while the received current flows through the transmitter and receiver in series, the energy thus wasted is no greater than the transmitter loss in a standard substation.

The proportioning of the arrangement of Fig. 2 to satisfy the fundamental requirements of the substation of my invention will now be given. In deriving the design formulæ, the resistances of the transformer windings will be ignored. It will be assumed further that there is no magnetic leakage between the transformer windings and that the self impedances are very large compared with the impedances of the component elements of the substation or the impedance of the line. Experience has shown that these simplifying assumptions are justified and that the assumed conditions may be closely realized in practice by careful design.

To formulate the condition for conjugacy of transmitter T and receiver R, assume an electromotive force in the transmitter circuit and assume that the desired condition of conjugacy is satisfied. In other words, assume that the terminals of the receiver are at points of equal potential with respect to an electromotive force applied to the transmitter. Let $I_1$, $I_2$, $I_3$ and $I_4$ denote the currents flowing in the transmitter, receiver, auxiliary resistance and line, respectively, and $R_1$, $R_2$, $R_3$ and $R_4$ denote the resistances of the corresponding elements. Furthermore, let the number of turns of the transformer windings connecting terminals $a$ and $b$, $a$ and $c$ and $a$ and $d$, respectively, be represented as follows:

$$N_{ab}=n_1$$
$$N_{ac}=n_2$$
$$N_{ad}=n_3$$

The condition of conjugacy of the receiver with respect to the transmitter requires that no current flow through the receiver and hence $I_2=0$. It is also clear from Fig. 3 that if no current flows through the receiver, $I_3=I_1$. Assuming a potential $V_{ae}$ applied across the terminals $a$ and $e$, since the potential so applied must equal the algebraic sum of the potential drop through the winding $N_3$ and the IR drop through the auxiliary resistance X, we have:—

$$V_{ae}=R_3I_3+Kn_3$$

where K designates the potential drop per turn of the transformer windings.

Since terminals $c$ and $e$ are at the same potential, it follows that $$V_{ae}=Kn_2$$

Combining these equations, we have $$R_3I_3+Kn_3=Kn_2$$

Assuming a potential $V_{ad}$ applied across the terminals $a$ and $d$, both the potential drop through the line and the IR drop through the winding $N_3$ must equal the potential so applied and we have $$V_{ad}=Kn_3=R_4I_4$$

Solving the above equations we have $$R_3I_3=K(n_2-n_3)$$
$$R_4I_4=Kn_3$$

whence $$\frac{R_3I_3}{R_4I_4}=\frac{n_2-n_3}{n_3}$$

Furthermore since the algebraic sum of the ampere turns of the three windings of the transformer must equal zero:

$$n_1 I_3 = n_3(I_3 - I_4)$$

$$\frac{I_3}{I_4} = \frac{n_3}{n_3 - n_1}$$

Combining the above equations, we get $$\frac{I_3}{I_4} = \frac{n_3}{n_3 - n_1} \quad (7)$$

and $$\frac{R_3}{R_4} = \frac{(n_2 - n_3)(n_3 - n_1)}{n_3^2} \quad (8)$$

When receiving (see Fig. 4) the line and auxiliary resistance are conjugate so that no current flows through the auxiliary resistance and the transmitter and receiver are in a local series circuit. Assuming a potential drop between terminals $c$ and $b$ it is apparent that the algebraic sum of the drop through the winding $N_2$ and the drop through the winding $N_1$ will equal the IR drop through the receiver and transmitter, whence $$K(n_2 - n_1) = (R_1 + R_2) I_1$$

Also since points $d$ and $e$ are at the same potential, it follows that the algebraic sum of the drops through the transmitter and windings $N_1$ and $N_3$ is zero. Hence $$K n_3 - K n_1 - R_1 I_1 = 0$$

or $$K n_3 = K n_1 - R_1 I_1$$

Combining we get $$\frac{R_1 + R_2}{R_1} = \frac{n_2 - n_1}{n_3 - n_1} \text{ or } \frac{R_2}{R_1} = \frac{n_2 - n_3}{n_3 - n_1} \quad (9)$$

Also since the resultant ampere turns of the transformer windings equals zero $$n_3 I_4 = (n_2 - n_1) I_1$$

from which we get $$\frac{I_1}{I_4} = \frac{n_3}{n_2 - n_1} \quad (10)$$

Now referring to equation 2 previously derived and remembering that during transmission $I_1 = I_3$, said equation may be written $$R_1 = \frac{I_4^2}{I_3^2} R_4 + R_3$$

From equation (7) it is apparent that $$\frac{I_4}{I_3} = \frac{n_3 - n_1}{n_3}$$

Substituting this value in equation (2) as rewritten, we have $$R_1 = \left(\frac{n_3 - n_1}{n_3}\right)^2 R_4 + R_3 \quad (11)$$

During reception it will be apparent from Fig. 4 that $I_1 = I_2$. Substituting this value in equation (6), we get $$R_1 = y R_2 \quad (12)$$

Collecting formulæ 8, 9, 11 and 12, we have the following:

$$\left. \begin{array}{l} \dfrac{R_3}{R_4} = \dfrac{(n_2 - n_3)(n_3 - n_1)}{n_3^2} \\[4pt] \dfrac{R_2}{R_1} = \dfrac{n_2 - n_3}{n_3 - n_1} \\[4pt] R_1 = \left(\dfrac{n_3 - n_1}{n_3}\right)^2 R_4 + R_3 \\[4pt] R_1 = y R_2 \end{array} \right\} (13)$$

Formulæ 13 may be written more generally as follows:

$$\left. \begin{array}{l} \dfrac{R_3}{R_4} = \dfrac{(N_{ac} - N_{ad})(N_{ad} - N_{ab})}{N_{ad}^2} \\[4pt] \dfrac{R_2}{R_1} = \dfrac{N_{ac} - N_{ad}}{N_{ad} - N_{ab}} \\[4pt] R_1 = \left(\dfrac{N_{ad} - N_{ab}}{N_{ad}}\right)^2 R_4 + R_3 \\[4pt] R_1 = y R_2 \end{array} \right\} (A)$$

The group of equations designated "A" constitute the general design formulæ for this type of substation and properly interpreted, as hereinafter set forth, determine the proper proportions of the elements of each substation herein disclosed. For the substation of Fig. 2, if we designate the winding ratios $$\frac{n_1}{n_3} \text{ and } \frac{n_2}{n_3}$$

by $r$ and $r'$, respectively, formulæ 13 (or A) become $$\left. \begin{array}{l} \dfrac{R_3}{R_4} = (r' - 1)(1 - r) \\[4pt] \dfrac{R_2}{R_1} = \dfrac{r' - 1}{1 - r} \\[4pt] R_1 = (1 - r)^2 R_4 + R_3 \\[4pt] R_1 = y R_2 \end{array} \right\} (14)$$

The third equation of the preceding group may be written $$\frac{R_1}{R_4} = (1 - r)^2 + \frac{R_3}{R_4}$$

Combining this equation with the first equation of the group, we have $$(1 - r)^2 + (r' - 1)(1 - r) = \frac{R_1}{R_4} \quad (15)$$

Furthermore combining the second and fourth equations of group 14, we have $$r' - 1 = \frac{1}{y}(1 - r) \quad (16)$$

Substituting this value in equation (15), we have $$(1 - r)^2 + \frac{1}{y}(1 - r)^2 = \frac{R_1}{R_4}$$

which reduces to $$(1 - r) = \pm \sqrt{\frac{R_1}{R_4} \cdot \frac{y}{1 + y}} \quad (17)$$

The plus or minus sign in equation (17) shows that there are two possible modes of winding the transformer corresponding to the two solutions.

From equations (16) and (17) we may derive the following:

$$(r'-1) = \pm \frac{1}{y}\sqrt{\frac{R_1}{R_4}\frac{y}{1+y}} \quad (18)$$

Solving equations (17), (18), and the first equation of group 14, we have $$R_3 = \frac{1}{1+y}R_1$$

Figure 1:
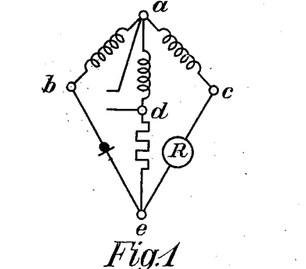
Figures 1, 5, 9, 13, 17 and 21 are schematic diagrams of six forms of substations in accordance with this invention, said diagrams being so arranged as to clearly indicate the equivalence of the different circuits.

Collecting, the design formulæ of the substation of Fig. 1 may be expressed as follows:

$$\left.\begin{array}{l} R_2 = \dfrac{1}{y}R_1 \\[4pt] R_3 = \dfrac{1}{1+y}R_1 \\[4pt] 1-r = \pm\sqrt{\dfrac{R_1}{R_4}\dfrac{y}{1+y}} \\[4pt] r'-1 = \pm\dfrac{1}{y}\sqrt{\dfrac{R_1}{R_4}\dfrac{y}{1+y}} \end{array}\right\} (B)$$

It will be observed that the above formulæ determine the winding ratios and the resistances of the receiver and the auxiliary element in terms of the resistances of the line and the transmitter and the ratio $y$. Since in general these three values will be known, the remaining elements of the substation may be readily computed.

A modified form of substation is illustrated in Fig. 6. In this figure the receiver R and the winding $N_2$ are serially connected between the terminals $b$ and $e$ in parallel with the transmitter T. The line L is serially connected with the winding $N_1$ across the terminals $b$ and $d$ in parallel with the winding $N_3$. The auxiliary resistance X is connected across terminals $d$ and $e$. Condensers may, if desired, be inserted as indicated to insure that the direct current supply will flow through the receiver R and transmitter T and to prevent its flow through the auxiliary resistance X. In this form of substation the current supply from the central station flows over the line and through windings $N_1$ and $N_2$, receiver R, transmitter T and winding $N_3$ back to line.

Figure 7:
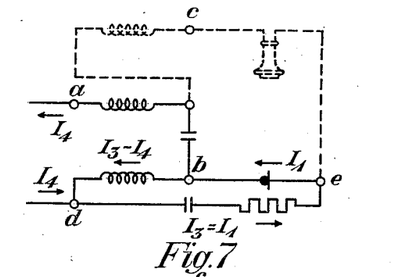

The operation of the substation of Fig. 6 during transmission will be clear from Fig. 7. Since no current flows through the receiver, the auxiliary resistance and the transmitter are in a series circuit and the variable potential set up by the transmitter causes a current $I_1$ which is equal to $I_3$ to flow from the terminal $d$ through the auxiliary resistance and the transmitter to the point $b$ where the current divides and a current $I_4$ flows through the winding $N_1$ and over the line L to point $d$, while a current $I_3-I_4$ flows through the winding $N_3$ to the point $d$. Potentials are induced in the transformer windings whereby the terminal $c$ is reduced to the same potential as terminal $e$, so that no current flows through the receiver during transmission.

Figure 8:
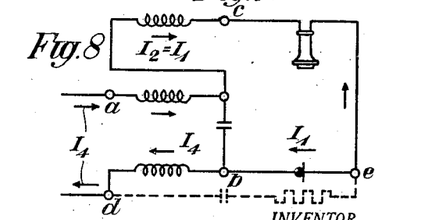
Figure 9:
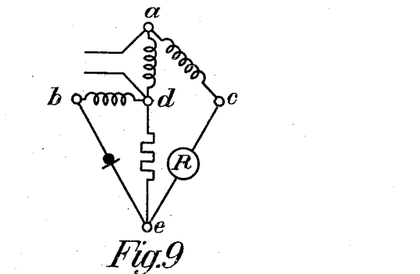

The operation when receiving is illustrated in Fig. 8. An electromotive force applied to the line causes a current $I_4$ to flow from the line terminal $a$ through the winding $N_1$, terminal $b$, winding $N_3$, terminal $d$ and back to the line. An induced current is set up in a local series circuit including the transmitter and the receiver so that a current $I_1$ equal to $I_2$ flows from terminal $b$ through the winding $N_2$, through the receiver and the transmitter back to terminal $b$. Potentials are induced in the transformer windings whereby the terminal $e$ is reduced to the same potential as the terminal $d$, so that no current is wasted through the auxiliary resistance X. The only received energy which is wasted is that lost through the impedance of the transmitter T, which is no greater loss than would occur in a standard substation circuit.

The design formulæ for the circuit of Fig. 6 may be readily determined from a consideration of formulæ B. It will be observed in formulæ B that $R_2$ and $R_3$ are independent of the transformer connections so that the first two formulæ of said group hold for all of the substations herein disclosed, since a comparison of Figs. 1, 5, 9, 13, 17 and 21 shows that the several substations differ from each other only in the transformer connections. Furthermore, if we write $N_{ab}$ for $n_1$, $N_{ac}$ for $n_2$ and $N_{ad}$ for $n_3$, formulæ B become:

$$\left.\begin{array}{l} R_2 = \dfrac{1}{y}R_1 \\[4pt] R_3 = \dfrac{1}{1+y}R_1 \\[4pt] \dfrac{N_{ad}-N_{ab}}{N_{ad}} = \pm\sqrt{\dfrac{R_1}{R_4}\dfrac{y}{1+y}} \\[4pt] \dfrac{N_{ac}-N_{ad}}{N_{ad}} = \pm\dfrac{1}{y}\sqrt{\dfrac{R_1}{R_4}\dfrac{y}{1+y}} \end{array}\right\} (C)$$

Formulæ C hold for all of the substations herein disclosed with a proper interpretation of the winding connections. A comparison of Figs. 2 and 6 shows that (taking proper account of the direction of winding)

$$N_{ab} = n_1$$
$$N_{ac} = n_1 + n_2$$
$$N_{ad} = n_1 + n_3$$

Hence the last two of formulæ C become $$\frac{n_3}{n_1+n_3} = \pm\sqrt{\frac{R_1}{R_4}\frac{y}{1+y}}$$

$$\frac{n_2-n_3}{n_1+n_3} = \pm\frac{1}{y}\sqrt{\frac{R_1}{R_4}\frac{y}{1+y}}$$

Writing $\frac{n_1}{n_2}$ as $r$ and $\frac{n_2}{n_3}$ as $r'$, the design formulæ for Fig. 6 are $$\left.\begin{array}{l} R_2 = \dfrac{1}{y}R_1 \\[4pt] R_3 = \dfrac{1}{1+y}R_1 \\[4pt] \dfrac{1}{r+1} = \pm\sqrt{\dfrac{R_1}{R_4}\dfrac{y}{1+y}} \\[4pt] \dfrac{r'-1}{r+1} = \pm\dfrac{1}{y}\sqrt{\dfrac{R_1}{R_4}\dfrac{y}{1+y}} \end{array}\right\} (D)$$

Figures 10, 14:
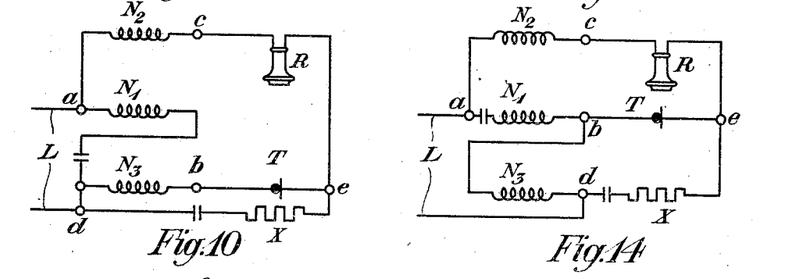

A still further modification is illustrated in Fig. 10 in which the receiver R and the winding $N_2$ are connected in series across the terminals $a$ and $e$, while the transmitter and winding $N_3$ are connected in series across terminals $d$ and $e$ in parallel with the auxiliary resistance X. The line L is connected across the terminals $a$ and $d$ in parallel with the winding $N_1$. Condensers may be inserted in series with the winding $N_1$ and the auxiliary resistance X, so that direct current from a distant source will flow over the line and through winding $N_2$, receiver R, transmitter T and winding $N_3$ back to the line.

Figures 11, 15:
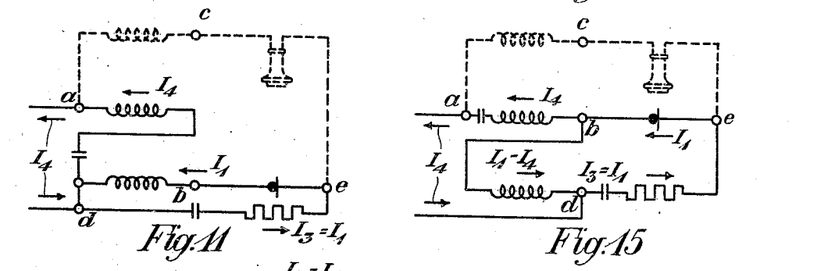

The operation in transmitting is illustrated in Fig. 11. Since no current flows through the receiver R the transmitter, auxiliary resistance and winding $N_3$ are in a local series circuit and the actuation of the transmitter sets up an electromotive force whereby a current $I_3$ equal to the current $I_3$ flows from terminal $d$ through the auxiliary resistance X, transmitter T and winding $N_3$, back to terminal $d$. An induced current $I_4$ is thereby caused to flow from the terminal $d$ through the winding $N_1$ and over the line L back to the terminal $d$. Electromotive forces are induced in the transformer windings of such value and direction that the terminal $c$ is reduced to the same potential as the terminal $e$ and consequently no current flows through the receiver during transmission.

Figure 12:
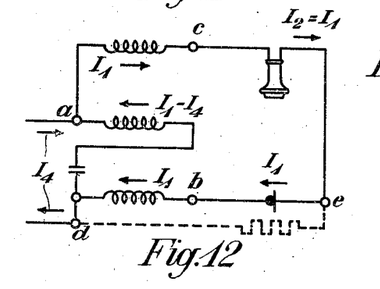
Figure 13:
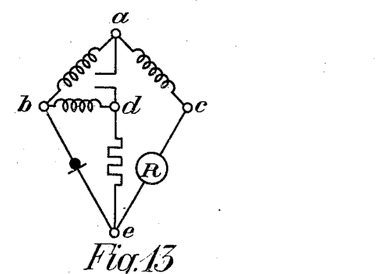

In receiving, as shown in Fig. 12, a current $I_4$ flows over the line from terminal $d$ to terminal $a$. Since no current flows through the auxiliary resistance the transmitter and receiver are in a series circuit and a current $I_1$ equal to the receiver current $I_2$ flows from terminal $a$, through the winding $N_2$, receiver R, transmitter T and winding $N_3$ to terminal $d$. The current $I_1$ is greater than the current $I_4$ and consequently a current $I_1-I_4$ flows from terminal $d$ to terminal $a$ through the winding $N_1$. The potentials induced in the windings of the transformer are of such value and direction as to reduce the terminal $e$ to the same potential as terminal $d$ so that no energy is wasted in the auxiliary resistance.

Referring now to formulæ C and comparing Fig. 10 with Fig. 2, the number of turns of the transformer windings connecting terminals $a$ and $b$, $a$ and $c$, and $a$ and $d$ may be expressed $$N_{ab} = n_1 + n_3$$
$$N_{ac} = n_2$$
$$N_{ad} = n_1$$

Substituting these values in formulæ C the last two formulæ become $$-\frac{n_3}{n_1} = \pm\sqrt{\frac{R_1}{R_4}\frac{y}{1+y}}$$

$$\frac{n_2-n_1}{n_1} = \pm\frac{1}{y}\sqrt{\frac{R_1}{R_4}\frac{y}{1+y}}$$

Writing as before $\frac{n_1}{n_3} = r$ and $\frac{n_2}{n_3} = r'$ we have as the design formulæ for the substation of Fig. 10

$$\left.\begin{array}{l} R_2 = \dfrac{1}{y}R_1 \\[4pt] R_3 = \dfrac{1}{1+y}R_1 \\[4pt] \dfrac{1}{r} = \pm\sqrt{\dfrac{R_1}{R_4}\dfrac{y}{1+y}} \\[4pt] \dfrac{r'-r}{r} = \pm\dfrac{1}{y}\sqrt{\dfrac{R_1}{R_4}\dfrac{y}{1+y}} \end{array}\right\} (E)$$

Another modification is illustrated in Fig. 14 in which the receiver R and winding $N_2$ are connected in series across terminals $a$ and $e$, while the transmitter T and winding $N_1$ are serially connected in parallel therewith. The auxiliary resistance X is serially connected with the winding $N_3$ between terminal $e$ and the junction point $b$ of the transmitter T and winding $N_1$. The line L is connected between terminal $a$ and the junction point $d$, between the auxiliary resistance X and the winding $N_3$. Condensers may be inserted in series with the winding $N_1$ and the auxiliary resistance X, so that direct current may flow from the line to terminal $a$ and thence in series through winding $N_2$, receiver R, transmitter T and winding $N_3$ back to the line.

The operation during transmission is indicated in Fig. 15. Since no current flows through the receiver, the auxiliary resistance and the transmitter are in a series circuit so that a current $I_3$ equal to the current $I_1$ flows from terminal $d$ through the auxiliary resistance X and the transmitter T to terminal b. At the point b the current divides and a current $I_4$ flows through the winding $N_1$ and over the line L, back to terminal d, while a current $I_1-I_4$ flows in parallel therewith from the terminal b, through the winding $N_3$ to the terminal d. Potentials are induced in the transformer windings of such value and direction that the terminal c is reduced to the same potential as the terminal e, and consequently no current flows through the receiver during transmission.

Figure 16:
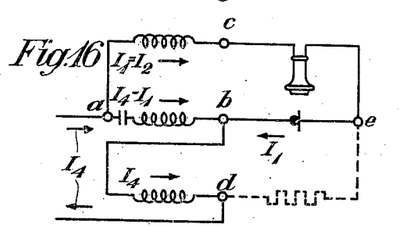
Figure 17:
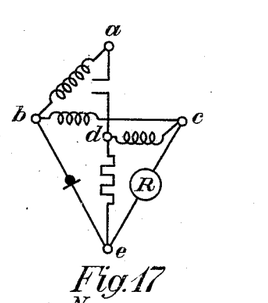

The action during reception is indicated in Fig. 16. A potential applied to the line causes a current $I_4$ to flow from the terminal b through the winding $N_3$ to point d and thence over the line L to the terminal a. At terminal a the current divides and a current $I_1$ equal to $I_2$ flows through the winding $N_2$, receiver R and transmitter T to point b, while the current $I_4-I_1$ flows in parallel therewith from the point a through the winding $N_1$ to the point b. Potentials are induced in the transformer which are of such value and direction as to reduce the terminal e to the same potential as the terminal d, so that no energy is wasted in the auxiliary resistance during the receiving operation.

The design formulæ for the substation of Fig. 14 may be derived from the general design formulæ C. Comparing Fig. 14 with Fig. 2 it will be seen that the number of turns of the transformer windings connecting terminals a and b, a and c and a and d may be expressed as follows:

$$N_{ab}=n_1$$
$$N_{ac}=-n_2$$
$$N_{ad}=n_1+n_3$$

Substituting these values in formulæ C the last two formulæ of said group become $$\frac{n_1}{n_1+n_3}=\pm\sqrt{\frac{R_1}{R_2}\frac{y}{1+y}}$$

$$\frac{-n_2}{n_1+n_3}=\pm\frac{1}{y}\sqrt{\frac{R_1}{R_2}\frac{y}{1+y}}$$

Expressing the ratio $\frac{n_1}{n_3}$ as $r$, and the ratio $\frac{n_2}{n_3}$ as $r'$, the formulæ appropriate to the substation of Fig. 14 may be expressed as follows:

$$\left.\begin{array}{c}R_2=\frac{1}{y}R_1\\[4pt] R_3=\frac{1}{1+y}R_1\\[4pt] \frac{r}{r+1}=\pm\sqrt{\frac{R_1}{R_4}\frac{y}{1+y}}\\[4pt] \frac{r'}{r+1}=\pm\frac{1}{y}\sqrt{\frac{R_1}{R_4}\frac{y}{1+y}}\end{array}\right\}(F)$$

Figure 18:
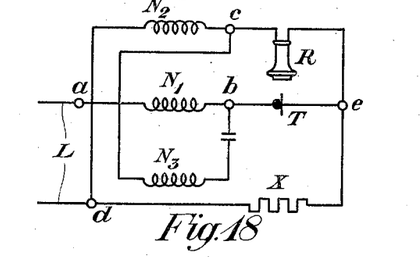

A fifth modification is illustrated in Fig. 18 in which the transmitter T and winding $N_1$ are serially connected between terminals a and e, the receiver R and winding $N_2$ are serially connected between terminals d and e, while the auxiliary resistance X is connected in parallel therewith between terminals d and e. The terminals b and c of the transmitter and receiver, respectively, are connected by winding $N_3$ which may have a condenser serially included in its circuit in order to properly direct the flow of current through the substation. The line L is connected to terminals a and d. Direct current from a distant source flows over the line to the terminal a and through the winding $N_1$ and the transmitter T to the terminal e, where it divides and flows through the auxiliary resistance X in parallel with the receiver R and winding $N_2$ to terminal d and thence back over the line.

Figure 19:
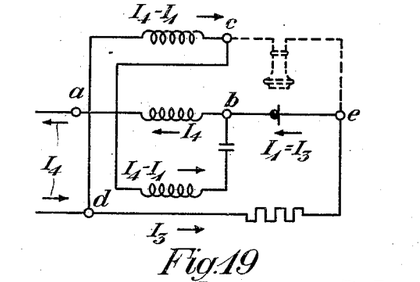

The operation during transmission is indicated in Fig. 19. Since no current flows through the receiver, the auxiliary resistance and transmitter are in a series circuit and a variable potential applied at the transmitter causes a current $I_3$ equal to $I_1$ to flow from terminal d through the auxiliary resistance X and transmitter T to terminal b. A current $I_4$ flows from terminal b through the winding $N_1$ and over the line L back to terminal d. A current $I_4-I_1$ flows from terminal d through the winding $N_2$ and through the winding $N_3$ to terminal b. Potentials are induced in the transformer windings of such value and direction that the terminal c is lowered to the same potential as terminal e, so that no current flows through the receiver.

Figure 20:
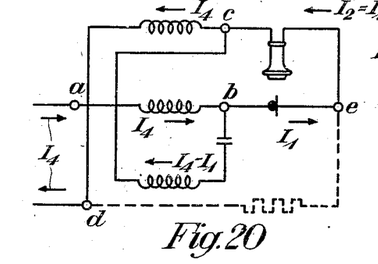
Figure 21:
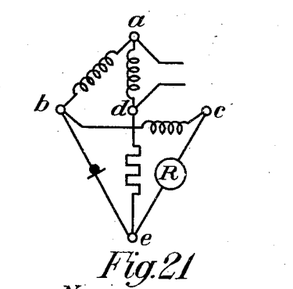

The operation during reception is indicated in Fig. 20. A potential applied to the line causes a current $I_4$ to flow from terminal c through the winding $N_2$ to terminal d and thence over the line L through winding $N_1$ to point b. At point b the current divides and a current $I_1$ equal to $I_2$ flows from terminal b through the transmitter T and receiver R to terminal c, while a current $I_4-I_1$ flows in parallel therewith through the winding $N_3$. The potentials induced in the transformer windings are of such value and direction as to reduce the terminal e to the same potential as terminal d, so that no energy is wasted in the auxiliary resistance during reception.

The design formulæ for the substation of Fig. 18 may be determined from the general formulæ C. Comparing Fig. 18 with Fig. 2, it will be clear that the number of turns connecting terminals a and b, a and c, and a and d, respectively, may be expressed as follows:

$$N_{ab}=n_1$$
$$N_{ac}=n_1-n_3$$
$$N_{ad}=n_1+n_2-n_3$$

Substituting these values in formulæ C, the last two formulæ of the group become $$\frac{n_2-n_3}{n_1+n_2-n_3}=\pm\sqrt{\frac{R_1}{R_4}\frac{y}{1+y}}$$

$$\frac{-n_2}{n_1+n_2-n_3}=\pm\frac{1}{y}\sqrt{\frac{R_1}{R_4}\frac{y}{1+y}}$$

Hence the design formulæ for the substation of Fig. 18 may be expressed as follows:

$$\left.\begin{array}{l}R_2=\dfrac{1}{y}R_1\\[4pt] R_3=\dfrac{1}{1+y}R_1\\[4pt] \dfrac{r'-1}{r+r'-1}=\pm\sqrt{\dfrac{R_1}{R_4}\dfrac{y}{1+y}}\\[4pt] \dfrac{-r'}{r+r'-1}=\pm\dfrac{1}{y}\sqrt{\dfrac{R_1}{R_4}\dfrac{y}{1+y}}\end{array}\right\}(G)$$

Figure 22:
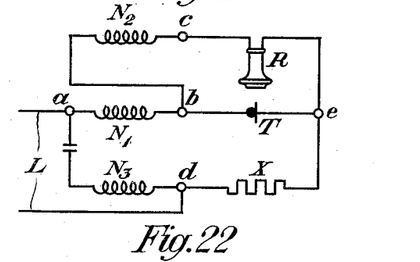

Fig. 22 illustrates still another form of substation. In this form the transmitter T is connected in series with the winding $N_1$ between terminals $a$ and $e$, while the auxiliary resistance X is connected in series with the winding $N_3$ between said terminals. The receiver R is connected in series with the winding 2 between terminals $b$ and $e$, while the line L is connected between the terminal $a$ and the junction point $d$ of the auxiliary resistance X and winding $N_3$. A condenser may be inserted in series with the winding $N_3$ so that direct current from a central station may flow over the line to terminal $a$, through the winding $N_1$ to point $b$. At point $b$ the current divides, one path continuing through the winding $N_2$ and receiver R to terminal $e$, while the other path is through the transmitter T. From terminal $e$ the current flows through the auxiliary resistance X to the terminal $d$ and then back over the line.

Figure 23:
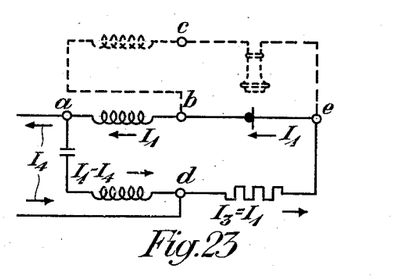

The operation during transmission is illustrated in Fig. 23. Since no current flows through the receiver, the auxiliary resistance, transmitter and winding $N_1$ are in a series circuit so that the potential variations applied at the transmitter cause a current $I_2$ equal to $I_1$ to flow from terminal $d$ through the auxiliary resistance X, transmitter T and winding $N_1$ to the point $a$. At the point $a$ the current divides so that a current $I_4$ flows over the line to the point $d$, while the current $I_1-I_4$ flows in parallel therewith through the winding $N_3$. Potentials are induced in the transformer windings of such value and direction as to reduce the terminal $c$ to the same potential as terminal $e$, so that no current flows through the receiver.

Figure 24:
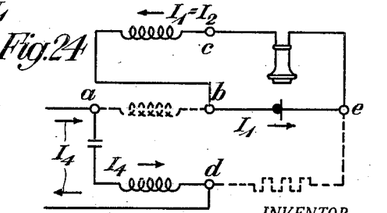

During reception, as indicated in Fig. 24, no current flows through the auxiliary resistance. Consequently the line is included in a local closed circuit through the winding $N_3$ and a potential applied to the line causes a current $I_4$ to flow over the line to the terminal $a$ and through the winding $N_3$ to terminal $d$ and then back over the line. An induced current $I_1$ equal to $I_2$ is caused to flow in a local closed circuit, including the transmitter T, receiver R and winding $N_2$. Potentials are induced in the windings of the transformer of such direction and value that points $a$ and $b$ are brought to the same potential and points $d$ and $e$ are brought to the same potential. Consequently no current flows from the point $a$ through the winding $N_1$ to point $b$ and no current flows from the point $e$ through the auxiliary resistance to point $d$.

The design formulæ for the substation of Fig. 22 may be determined from the general design formulæ C. Comparing Fig. 22 with Fig. 2, the number of turns connecting terminals $a$ and $b$, $a$ and $c$ and $a$ and $d$, respectively, may be expressed as follows:

$$N_{ab}=n_1$$
$$N_{ac}=n_1+n_2$$
$$N_{ad}=n_3$$

Substituting these values in formulæ C the last two equations of said group may be written $$\frac{n_3-n_1}{n_3}=\pm\sqrt{\frac{R_1}{R_4}\frac{y}{1+y}}$$

$$\frac{n_1+n_2-n_3}{n_3}=\pm\frac{1}{y}\sqrt{\frac{R_1}{R_4}\frac{y}{1+y}}$$

The design formulæ for the substation of Fig. 22 may, therefore, be expressed as follows:

$$\left.\begin{array}{l}R_2=\dfrac{1}{y}R_1\\[4pt] R_3=\dfrac{1}{1+y}R_1\\[4pt] 1-r=\pm\sqrt{\dfrac{R_1}{R_4}\dfrac{y}{1+y}}\\[4pt] r+r'-1=\pm\dfrac{1}{y}\sqrt{\dfrac{R_1}{R_4}\dfrac{y}{1+y}}\end{array}\right\}(H)$$

The type of substation disclosed above and illustrated in the accompanying drawing is but one of a large number employing only one transformer and one auxiliary resistance and all of these are ideal in the sense that they satisfy the fundamental requirements for an ideal substation, as stated heretofore in this specification. It will be understood therefore, that my invention is not limited to the specific embodiments herein illustrated, but is broadly directed to providing a substation comprising a single transformer and only one auxiliary element, which is so proportioned with reference to the line with which it is to be coöperatively combined, that it is ideally efficient and substantially without side tone. Furthermore, I do not desire to limit the design of the substations herein disclosed and illustrated to the accompanying design formulæ. These formulæ are derived on the assumption that ideal transformers are employed and that the component elements have no reactance, assumptions which are only approximately justified in practice. When particularly high precision is desired I may, therefore, proportion the substation more precisely by taking into account the fact that the transformer impedances are finite, and that the line and the various substation elements may have in general some reactance. The accompanying formulæ however, give quite satisfactory results, and the methods by which they are derived will enable one skilled in the art, to compute more precisely the substation constants when desired.

It will be understood that in the appended claims, where certain elements are said to be conjugate, or certain impedance relations are said to exist, since in practice these conditions can, in general, only be approximated, these expressions will be satisfied by structures substantially conforming thereto, especially where some compromise with regard to the rigid requirements is necessary in order to discriminate against line noise. It will also be understood that while I have specifically illustrated and described my invention as embodied in a telephone substation it is capable of many and varied embodiments which render it applicable in other kinds of signaling systems and consequently my invention is not to be limited to the particular form and use herein disclosed. It will be further understood that in this specification the word substation is employed in its generic sense and that consequently its significance is not limited to a subscriber's telephone station but embraces broadly a telephone station including a repeater station for relaying telephonic signals.

What is claimed is:

1. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal.

2. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal, said elements being so proportioned and related that the impedance of the combination comprising said induction coil, said first and last mentioned paths and said resistance, as seen from said second mentioned path, is equal to the impedance of said second mentioned path.

3. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal, said elements being so proportioned and related that the impedance of the combination comprising said induction coil, said auxiliary resistance and said paths including transmitting and receiving apparatus, as seen from said first mentioned path, is equal to the impedance of said first mentioned path.

4. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal, said elements being so proportioned and related that said path including receiving apparatus and said path including transmitting apparatus are conjugate.

5. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal, said elements being so proportioned and related that said auxiliary resistance and said first mentioned path are conjugate.

6. A signaling circuit comprising a three winding induction coil and four component elements consisting of a path for the transmission and reception of signals, a path including a transmitting apparatus, a path including a receiving apparatus, and an auxiliary resistance; one of said three paths including a winding of the induction coil, said first mentioned path being shunted by at least a part of the windings of said induction coil, said auxiliary resistance being in a series circuit including said first mentioned path, and said auxiliary resistance and the other two paths having a common terminal, said elements being so proportioned and related that the impedance of the combination comprising said induction coil, said first and last mentioned paths and said resistance, as seen from said second mentioned path, is equal to the impedance of said second mentioned path, the impedance of the combination comprising said induction coil, said auxiliary resistance and said paths including transmitting and receiving apparatus, as seen from said first mentioned path, is equal to the impedance of said first mentioned path, said path including receiving apparatus and said path including transmitting apparatus are conjugate and said auxiliary resistance and said first mentioned path are conjugate.

In testimony whereof, I have signed my name to this specification this 9th day of August 1917.

GEORGE A. CAMPBELL.

Copies of this patent may be obtained for five cents each, by addressing the "Commissioner of Patents, Washington, D. C."